(12) United States Patent
Knappworst et al.

(10) Patent No.: US 11,642,817 B2
(45) Date of Patent: May 9, 2023

(54) 3-D PRINTED MASTER MODEL

(71) Applicant: adidas AG, Herzogenaurach (DE)

(72) Inventors: Joerg Knappworst, Oberasbach (DE); Tay Tsyr Chun, Guangdong (CN)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/451,703

(22) Filed: Oct. 21, 2021

(65) Prior Publication Data

US 2022/0048222 A1 Feb. 17, 2022

Related U.S. Application Data

(62) Division of application No. 16/139,483, filed on Sep. 24, 2018, now Pat. No. 11,298,854.

(30) Foreign Application Priority Data

Sep. 25, 2017 (DE) ...................... 10 2017 216 944.3

(51) Int. Cl.
| | | |
|---|---|---|
| *B29C 33/42* | (2006.01) | |
| *B29C 33/38* | (2006.01) | |
| *A43B 13/22* | (2006.01) | |
| *B29D 35/12* | (2010.01) | |
| *B29C 64/171* | (2017.01) | |
| *B29C 64/40* | (2017.01) | |
| *B29C 33/40* | (2006.01) | |
| *B33Y 10/00* | (2015.01) | |
| *B33Y 50/02* | (2015.01) | |
| *B33Y 80/00* | (2015.01) | |
| *B29C 64/393* | (2017.01) | |
| *B29C 64/106* | (2017.01) | |
| *A43B 13/04* | (2006.01) | |

(Continued)

(52) U.S. Cl.
CPC ............ *B29C 33/424* (2013.01); *A43B 13/04* (2013.01); *A43B 13/223* (2013.01); *B29C 33/3835* (2013.01); *B29C 33/3842* (2013.01); *B29C 33/40* (2013.01); *B29C 64/106* (2017.08); *B29C 64/171* (2017.08); *B29C 64/393* (2017.08); *B29C 64/40* (2017.08); *B29D 35/122* (2013.01); *B33Y 10/00* (2014.12); *B33Y 50/02* (2014.12); *B33Y 80/00* (2014.12); *A43B 13/16* (2013.01); *A43D 2200/60* (2013.01); *B29C 2033/385* (2013.01); *B29L 2031/757* (2013.01)

(58) Field of Classification Search
CPC ...................... B29C 33/3835; B29C 2033/385
See application file for complete search history.

(56) References Cited

U.S. PATENT DOCUMENTS

| | | |
|---|---|---|
| 1,960,583 A | 5/1934 | Harding |
| 3,632,278 A | 1/1972 | Hall et al. |
| 5,173,220 A | 12/1992 | Reiff et al. |

(Continued)

FOREIGN PATENT DOCUMENTS

| | | |
|---|---|---|
| DE | 3515927 A1 | 11/1985 |
| DE | 100 25 804 A1 | 11/2001 |
| WO | 2017/137301 A1 | 8/2017 |

*Primary Examiner* — Atul P. Khare
(74) *Attorney, Agent, or Firm* — Sterne, Kessler, Goldstein & Fox P.L.L.C.

(57) ABSTRACT

This disclosure concerns a master model for the production of a mold, comprising: (a) a first part, a second part comprising a textured surface; wherein the first part and the second part are connected.

9 Claims, 11 Drawing Sheets

(51) Int. Cl.
 *A43B 13/16* (2006.01)
 *B29L 31/00* (2006.01)

(56) References Cited

U.S. PATENT DOCUMENTS

| | | |
|---|---|---|
| 5,435,959 A | 7/1995 | Williamson et al. |
| 5,580,507 A | 12/1996 | Williamson et al. |
| 5,713,410 A | 2/1998 | Lasalle et al. |
| 5,906,234 A | 5/1999 | Mastrorio et al. |
| 6,177,034 B1 | 2/2001 | Ferrone |
| 6,558,496 B1 | 5/2003 | Brooke et al. |
| 9,089,999 B2 | 7/2015 | Dean |
| 9,206,309 B2 | 12/2015 | Appleby et al. |
| 9,315,663 B2 | 4/2016 | Appleby et al. |
| 9,474,327 B2 | 10/2016 | Bunnell et al. |
| 10,299,722 B1 | 5/2019 | Tran et al. |
| 2007/0029698 A1 | 2/2007 | Rynerson et al. |
| 2010/0032863 A1* | 2/2010 | Mahaffy ................ B29C 33/76 264/220 |
| 2018/0071980 A1 | 3/2018 | Lomasney et al. |
| 2019/0248054 A1 | 8/2019 | Mike et al. |

* cited by examiner

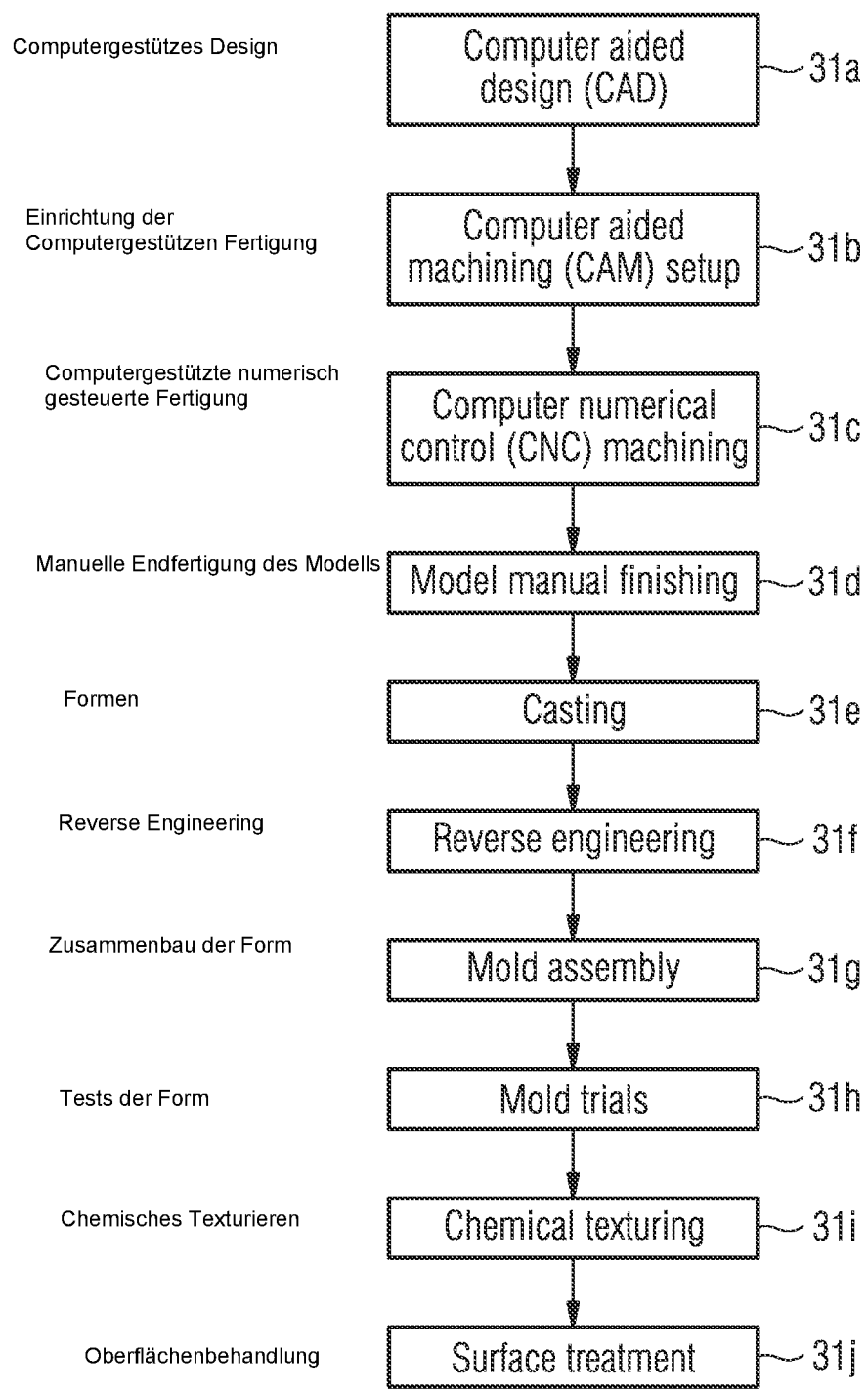

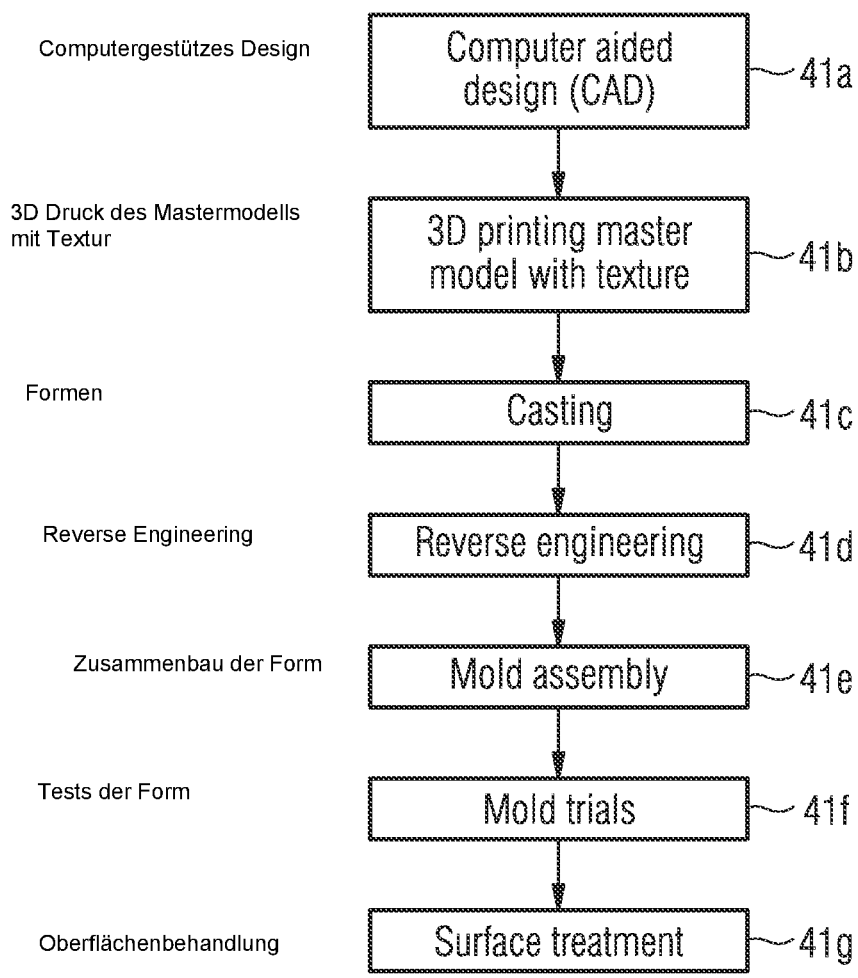

3-D PRINTED MASTER MODEL

TECHNICAL FIELD

The present invention relates to a master model for the production of a mold in particular for forming a sole element for an article of footwear, and methods for producing the same.

PRIOR ART

The texture of a surface is crucial for the level of grip provided by the surface. A smooth surface will be slippery especially when it is wet. Therefore, textured surfaces are a common way of achieving a preferred level of grip. For example, a sole of an article of footwear is usually textured to improve the traction of the sole on the ground. Though textured surfaces are commonly used for this purpose, it is actually mechanically far more challenging to produce a textured surface than it is to produce a smooth surface.

A sole or a sole element for an article of footwear is usually produced by filling a moldable material into a mold and curing the moldable material. The texture is achieved by texturing the mold. It is known in the art that a textured mold can be produced by a chemical etching process. However, this chemical etching process is labor-intensive and requires large amounts of acid and thus has an unfavourable impact on the environment. For an improved grip, textures with sharp edges would be preferred but these cannot be produced by chemical etching.

U.S. Pat. No. 9,474,327 B2 discloses a sole structure master modeling a sole structure that may have textures formed on one or more surfaces by a laser. However, in a method disclosed by U.S. Pat. No. 9,474,327 B2, an unfinished footwear sole structure master is produced and the texture is formed by a laser in a secondary step. Therefore, forming a texture requires an additional separate process step in addition to the step of forming the unfinished footwear sole structure master. In addition, there is a risk of damaging the footwear sole structure master in the laser texturing process step. Since in this method the laser is only used to remove material and cannot add any material, it is laborious and time-consuming to produce textures that extend outwards from a surface, rather than a texture that is carved into a surface. In addition, it is noted that other metal processing techniques such as milling cannot achieve the fine textures required for optimal grip. The resolution that can be achieved with conventional milling is on the order of 1 mm or larger.

U.S. Pat. No. 9,089,999 B2 discloses methods of manufacturing wearable articles that include (a) performing a scan of a body part of a user on which the wearable article will be worn; (b) creating a virtual design of a mold insert configured to mold the wearable article, based on the scan; (c) saving the virtual design in a data file; (d) fabricating the mold insert using a laser sintering, fused deposition modeling, and stereolithography technique; (e) inserting the mold insert into a mold; (f) inserting moldable material into a cavity created at least in part by the mold insert; (g) molding the moldable material to produce the wearable article; and (h) removing the wearable article from the mold. The wearable article may include a portion of an article of footwear, such as a portion of a shoe sole. The mold inserts may be formed including a pattern or texture that will appear on a surface of the molded articles.

However, since the mold insert is used during the molding of the moldable material, the mold insert is subject to severe wear and tear due to the harsh conditions under which molding necessarily has to be performed such as high temperatures and high pressures. As a result, the texture on the surface of the mold insert and the mold insert itself experience a short usable lifespan and the quality of the texture that can be achieved deteriorates rapidly every time the mold insert is used. Furthermore, if only some of the texture has deteriorated, the entire mold insert has to be replaced.

In addition, conventional manufacturing techniques, such as milling, laser texturing, or chemical etching are effective only for textures forming a recess on the surface, which are performed by removing material from the surface of a molded component and no new material can be added. Therefore, in conventional manufacturing techniques large amounts of waste are generated when a texture is formed that comprises an outward extension from the surface. Though it would be possible to form a negative model comprising a grove first and then cast a positive model on that basis, this would lead to an additional process step and restrict the suitable choice of materials.

Metallic molds comprising a textured surface can also be produced directly by additive manufacturing. However, using additive manufacturing to produce large volumes of metal is very slow and costly. Furthermore, the resolution of the texture of a metallic mold produced directly by additive manufacturing is often poor leading to a poor level of grip.

There is thus a considerable need for an improved method of producing a molded component that requires a texture, that is more environmentally sustainable, more flexible, more reliable, and produces a higher quality texture than existing methods.

SUMMARY OF THE INVENTION

The underlying problem is solved by a master model for the production of a mold, comprising: (a) a first part, (b) a second part comprising a textured surface; wherein the first part and the second part are connected.

A master model for the production of a mold within the present invention is the most fundamental physical model upon which the mold is based. In particular, the master model is used for the production of the mold. It is to be understood that the first part and the second part refer to different physical components that are connected in a separable or inseparable way. In other words, the term "part" refers to a physical part rather than merely a different region of the master model. It is to be understood that a master model according to the present invention may contain more than two parts. For example, the master model may contain a first part, and a second and a third part comprising a textured surface. The present invention merely requires at least two parts of which at least one comprises a textured surface. The term "molded component" in the present context refers to any product formed by using the mold. The term "texture" or "textured surface" within the context of the present invention applies to any modulation of the height of a surface.

The first part and the second part comprising a textured surface may be produced by additive manufacturing, such as laser sintering, direct metal laser sintering, selective laser melting, fused deposition modelling (FDM®), fused filament fabrication, and stereolithography. Further details on the method for producing the master model are provided elsewhere herein.

For the manufacture of a mold including a textured surface, the step of producing the texture requires mechanical finesse and the texture is the most susceptible to wear and tear. An advantage of the master model according to the present invention is that the wear and tear, that necessarily results from the harsh conditions of molding a molded component, for example due to high temperatures and pressures during the molding, is significantly reduced compared to using a mold insert. This is partly because the present invention allows a mold with a textured surface to be made from a durable material, for example a metal.

An advantage of the master model according to the present invention is that a mold comprising a textured surface can be produced based on the master model without chemical etching or laser texturing. This is because the master model itself comprises the second part comprising a textured surface. For example, the mold could be cast directly or indirectly based on the master model. Casting is a quick, cost-effective, and reproducible method that allows the production of large numbers of molds while retaining a high resolution of the texture. Resolution in the present context is the smallest size with which features can be formed deliberately and reproducibly. Further details on the method for producing the mold based on the master model are provided elsewhere herein.

Another advantage of the master model according to the present invention is the increased flexibility of producing a mold. Due to the modular nature of the master model, a first mold with a first type of texture and a second mold with a second type of texture could, in general, be produced by designing only a single first part of the master model and by designing two varieties of the second part of the master model. This way, the development process becomes more efficient.

The mold may be for the production of an article of footwear and the master model may be a positive model of a portion of the article of footwear. The master model according to the present invention is particularly suitable for forming a mold for the production of an article of footwear. This is because in a typical production environment for footwear, very large amounts of textured components need to be produced quickly and reproducibly. One master model according to the present invention could be used to manufacture several molds which can then be used in parallel to produce a portion of the article of footwear by casting. If the master model is a positive model of a portion of the article of footwear, it is possible to directly cast, within a single step, a mold that is a negative model of a portion of the article of footwear.

The terms "positive model" and "negative model" are used analogously to their usual meaning in photography. For example, an ideal positive model of a solid sphere of diameter d would be an identical solid sphere of diameter d, whereas an ideal negative model of a solid sphere of diameter d would be a spherical cavity of diameter d. In practice, there will be some deviations from an ideal positive or negative model due to manufacturing imperfections. Sometimes, the term "casting core" is used for a positive model and sometimes the term "casting cavity" is used for the negative model.

The mold may be for the production of an article of footwear and the master model may be a negative model of a portion of the article of footwear. If the master model is a negative model of a portion of the article of footwear, it is possible to cast, with only one intermediate step, a mold that is a negative model of a portion of the article of footwear. For example, it would be possible to cast a second model, which is a positive model of a portion of the article of footwear, based on the master model. The second model may be from a heat-resistant material, for example a ceramic material, in order to prevent damage to the master model by casting the mold.

The first part of the master model may substantially define the rim of an entire sole element of the article of footwear. By "substantially define" it is meant in the present context that the shape of the rim of the sole element of the article of footwear is determined by the shape of the first part of the master model within manufacturing imperfections. The sole element could be an entire footwear outsole, or it may be only a portion of an outsole. The combination of the single first part with different second parts with different textures therefore advantageously allows several articles of footwear to be constructed that are similar in size and shape but that require a different texture, for example a running shoe for soft ground and a running shoe for hard ground.

The master model according to the present invention may be a positive or negative model of any component that requires a textured surface. For example, the master model may alternatively be used for the production of a mold for forming textured handles for bicycle handlebars, handles for sports rackets, golf clubs, balls, gloves, etc.

The first part and/or the second part of the master model according to the present invention may be made from a resin or polymer material. The term "made from" is used generally herein such as to be synonymous with "comprise", i.e. in this example, the first part and/or the second part comprises a resin or polymer material but either the first part or the second part, or both the first part and the second part, may comprise additional material(s) as well. A master model made from a resin or polymer material is simple to construct with a high-resolution texture. Furthermore, a resin or polymer material allows sufficient strength and water resistance.

The master model may be made from an activated photopolymer. Here, a photopolymer is any substance that can be activated by light, wherein activation causes a liquid photopolymer to solidify. By using a photopolymer it is possible to construct the master model by stereolithography which allows the master model with a particularly high-resolution texture to be achieved at fast production speeds. Stereolithography allows a resolution of about 0.1 mm to be achieved. Further details on the method for producing the master model are given elsewhere herein.

The first part and the second part may be made from the same material. By using the same material for the first part and the second part, it is possible to produce the first part and the second part simultaneously by additive manufacturing methods.

The first part and the second part may be separably connected. Any feasible attaching materials and/or adhesives, such as glue, tape, etc., can be used to attach the second parts to the first part. Clip elements or pin elements can also be used. For example, a thin layer of adhesive could be used to connect the second part to the first part strongly enough to allow further processing to produce the mold, while still allowing the first part and the second part to be separated upon application of a sufficient amount of force without damaging the first part or the second part. It is important and preferred that the first part and the second part(s) are arranged in a good fit with each other during use.

If the first part and the second part are separably connected, the modularity of the process is increased advantageously. A single first part could be produced and used in combination with a second part comprising a first type of texture to produce a first mold with a first type of texture. The same first part could be used in combination with the second part comprising a second type of texture to produce a second mold with a second type of texture, wherein the shape of the second mold could be substantially similar to the shape of the first mold. "Substantially similar" in the present context means similar but with the exception of the texture due to the second part and manufacturing imperfections. Furthermore, since the greatest wear and tear is expected for the texture, it is possible to simply replace a second part on which the texture has deteriorated due to wear and tear while leaving the first part in place. Likewise, should the first part be damaged, for any reason, but the second part is still intact, only the first part needs to be replaced. This way, waste and the costs associated therewith can be reduced, resulting in a more favorable environmental impact.

The first part of the master model may also comprise a textured surface. In other words, both the first part and the second part of the master model may comprise a textured surface. The textured surface on the first part could have a similar texture pattern to the texture pattern on the second part, or the first part may have a completely different texture pattern to the texture pattern of the second part. By forming a textured surface also on the first part, the overall grip provided by the molded component formed in the mold is improved, while the flexibility of combining a first part and the second part or a first part and a different second part remains.

The resolution of the texture of a mold based on the master model of the present invention is better than for a metallic or ceramic mold produced directly by additive manufacturing. This is true if only the second part comprises a textured surface or if both the first and the second part comprise a textured surface. A better resolution of the texture allows for a greater variety of textures to be formed and, in general, therefore an improved level of grip.

The textured surface of the first part and/or the second part may comprise at least one resolved feature of linear size of preferably 0.2 mm or smaller, more preferably 0.1 mm or smaller. The inventors have found that a feature size of 0.2 mm or smaller significantly improves the amount of grip offered by the surface of the molded component for some applications, for example for a shoe sole on a hard surface. In some applications, the grip is even better when the feature has a size of 0.1 mm or smaller. The linear size can be measured along any linear direction on the surface of the first or second part, respectively. The feature could, for example, be a "hill-like" protrusion from the surface or a groove. Additive manufacturing allows a resolution of up to 0.01 mm.

The textured surface of the first part and/or the second part may comprise at least one feature with a depth or height of between 0.01 mm and 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the molded component on soft ground, such as grass, mud, etc. However, a shallow texture, corresponding to a lower depth or height of the feature, may provide better grip on hard ground such as artificial turf, tarmac, etc.

The second part may be substantially smaller than the first part. This is advantageous for the stability of the master model as it allows the first part to essentially define the shape of the mold and, consequently, the molded component while the second part defines primarily the texture or part of the texture of the mold and, consequently, the molded component.

The invention further concerns a mold produced using the master model described herein. A mold produced using the master model described herein may have a higher resolution of texture and sharper features of the texture than a mold produced using techniques known in the art.

An advantage of the present invention is that it allows the production time, or lead time, for producing a mold to be reduced significantly compared to conventional production processes for a textured mold.

Preferably at least one surface of the mold comprises a texture with a resolved feature of linear size of preferably 0.2 mm or smaller, more preferably 0.1 mm or smaller. The inventors have found that a feature size of 0.2 mm or smaller significantly improves the amount of grip offered by the surface of the molded component for some applications, for example for a shoe sole on a hard surface. In some applications, the grip is even better when the feature has a size of 0.1 mm or smaller. The finer texture also leads to a more visually appealing look of the molded component.

The mold may comprise at least one feature with a depth or height of between 0.01 mm and 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the molded component on soft ground, such as grass, mud, etc. and the greater the durability of the texture. However, a shallow texture, corresponding to a lower depth or height of the feature, may provide better grip on hard ground such as artificial turf, tarmac, etc.

The mold may be made from a metal. Since the mold is to be used for the production of large amounts of molded components, it is important that the mold is sufficiently robust. A mold comprising metal is simple to form as it can be, for example, formed by casting melted metal. A mold comprising metal is also sufficiently robust to allow it to be generally used many times before the texture suffers damage.

The invention further concerns a sole element produced from the mold described herein and, accordingly, indirectly from the master model described herein. A sole element produced using the mold described herein may have a higher resolution of texture and sharper features of the texture than a mold produced using techniques known in the art. Preferably the sole element comprises at least one surface comprising a texture with a resolved feature of linear size of preferably 0.2 mm or smaller, more preferably 0.1 mm or smaller. The inventors have found that a feature size of 0.2 mm or smaller significantly improves the amount of grip offered by the surface of the sole element for some applications, for example on a hard surface. In some applications, the grip is even better when the feature has a size of 0.1 mm or smaller. The finer texture also leads to a more visually appealing look of the sole element.

The sole element may comprise at least one feature with a depth or height of between 0.01 mm to 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the molded component on soft ground, such as grass, mud, etc. and the greater the durability of the texture. However, a shallow texture, corresponding to a lower depth or height of the feature, may provide better grip on hard ground such as artificial turf, tarmac, etc.

The invention further concerns an article of footwear comprising the sole element described herein. The article of footwear comprising the sole element described herein has a better grip than an article of footwear known in the art.

The invention further concerns a ball or a sports accessory comprising a portion produced using the mold described herein and, accordingly, indirectly from the master model described herein. A sports accessory can be a glove, for example a glove for a goalkeeper, a shin guard, a handle for bicycle handlebars, handles for sports rackets, golf clubs, etc.

A ball or a sports accessory produced using the mold described herein may have a higher resolution of texture and sharper features of the texture than a mold produced using techniques known in the art. Preferably the sole element comprises at least one surface comprising a texture with a resolved feature of linear size of preferably 0.2 mm or smaller, more preferably 0.1 mm or smaller. The inventors have found that a feature size of 0.2 mm or smaller significantly improves the amount of grip offered by the surface of the sole element for some applications, for example to improve the grip of a football or a glove to catch a football. In some applications, the grip is even better when the feature has a size of 0.1 mm or smaller.

The ball or sports accessory may comprise at least one feature with a depth or height of between 0.01 mm to 5 mm. For certain applications, the depth or height is preferably 0.01 mm to 1 mm. For other applications, it is preferable to have a depth or height of between 1 mm and 5 mm. For example, the inventors have found that the deeper or higher the feature, compared to the surrounding surface, the greater is the level of protection offered by a shin guard, while maintaining a low weight. However, a shallow texture, corresponding to a lower depth or height of the feature, may provide better aerodynamic properties for example for part of the panels of a football.

The invention further concerns a method for producing a master model for the production of a mold, comprising: (a) forming a first part, (b) forming a second part comprising a textured surface, (c) connecting the first part and the second part; wherein the first part and the second part are formed by additive manufacturing.

Additive manufacturing is taken to have its conventional meaning. That is, additive manufacturing is any technique which applies an additive shaping principle and thereby builds physical 3D geometries by successive addition of material. Additive manufacturing comprises 3D printing and rapid prototyping. In particular, additive manufacturing comprises techniques such as laser sintering, direct metal laser sintering, selective laser melting, fused deposition modelling (FDM®), fused filament fabrication, and stereolithography. Any additive manufacturing method is suitable for the present invention.

An advantage of producing the first part and the second part of the master model by additive manufacturing is that the number of process steps required during production can be reduced compared to the conventional way of producing a mold with a textured surface. In particular, starting from an existing computer aided design (CAD) model, chemical etching requires at least: setting up computer aided machining, performing computer numerical control, and manual finishing. These steps are replaced, generally, by only a single process step in which the first part of second part is produced, also known as printed. Only minor manual finishing is generally required for additive manufacturing. In addition, chemical etching also requires the step of performing the chemical texturing, which is also not required for the method according to the present invention.

Another advantage of producing the first part and the second part of the master model by additive manufacturing is that additive manufacturing is an efficient method for forming a texture comprising an outward extension from the surface as well as a texture comprising a recess in the surface.

Furthermore, the resolution of the texture of a mold based on the master model of the present invention is better than for a metallic mold produced directly by additive manufacturing. A better resolution of the texture allows for a greater variety of textures to be formed and, in general, therefore an improved level of grip.

Another advantage of the method according to the present invention is the increased flexibility of producing a mold. Due to the modular nature of the master model, a first mold with a first type of texture and a second mold with a second type of texture could, in general, be produced by designing only a single first part of the master model and by designing two varieties of the second part of the master model. This way, the development process becomes more efficient.

The mold may be for the production of an article of footwear and the master model may be formed as a positive model of a portion of an article of footwear. The method according to the present invention is particularly suitable for forming a mold for the production of an article of footwear. This is because in a typical production environment for footwear, very large amounts of textured components need to be produced quickly and reproducibly. One master model according to the present invention could be used to manufacture several molds which can then be used in parallel to produce a portion of the article of footwear by casting. If the master model is a positive model of a portion of the article of footwear, it is possible to directly cast, within a single step, a mold that is a negative model of a portion of the article of footwear.

The terms "positive model" and "negative model" are used analogously to their usual meaning in photography. For example, an ideal positive model of a solid sphere of diameter d would be an identical solid sphere of diameter d, whereas an ideal negative model of a solid sphere of diameter d would be a spherical cavity of diameter d. In practice, there will be some deviations from an ideal positive or negative model due to manufacturing imperfections. Sometimes, the term "casting core" is used for a positive model and sometimes the term "casting cavity" is used for the negative model.

The mold may be for the production of an article of footwear and the master model may be a negative model of a portion of the article of footwear. If the master model is a negative model of a portion of the article of footwear, it is possible to cast, with only one intermediate step, a mold that is a negative model of a portion of the article of footwear. For example, it would be possible to cast a second model, which is a positive model of a portion of the article of footwear, based on the master model. The second model may be from a heat-resistant material, for example a ceramic material, in order to prevent damage to the master model by casting the mold.

The first part of the master model may be formed such that the first part substantially defines the rim of an entire sole element of the article of footwear. By "substantially define" it is meant in the present context that the shape of the rim of the sole element of the article of footwear is determined by the shape of the first part of the master model within manufacturing imperfections. The sole element could be an entire footwear outsole, or it may be only a portion of an outsole. The combination of the single first part with different second parts with different textures therefore advantageously allows several articles of footwear to be constructed that are similar in size and shape but that require a different texture, for example a running shoe for soft ground and a running shoe for hard ground.

The first part and/or the second part may be made from a resin or polymer material. A first part and/or second part made from a resin or polymer material is simple to construct with a high-resolution texture. Furthermore, a resin or polymer material allows sufficient strength and water resistance.

Forming the master model may comprise activating a liquid photopolymer such that the liquid photopolymer solidifies. Here, a photopolymer is any substance that can be activated by light, wherein activation causes a liquid photopolymer to solidify. It is possible to construct the master model by stereolithography. In stereolithography, a layer of liquid photopolymer is formed inside a stereolithography machine. A light, which may be an ultraviolet laser, is used to selectively activate the liquid photopolymer at selected points on the layer, causing the liquid photopolymer to solidify. The points are determined by the computer model, or computer aided design (CAD) model, of the part that is to be produced by additive manufacturing. The light may be projected onto a single point, or several points simultaneously. For example, a single laser head may be used, or a double laser head may be used. It is also possible to simultaneously project the light onto many points, for example by controlling an array of mirrors, which allows the production speed to be increased. When one layer has been completed, that is when the photopolymer has been activated at every intended point, an additional layer of liquid photopolymer is provided. For example, the solidified layer may be lowered by an elevator-like construction and an additional layer of liquid photopolymer could be distributed evenly across the top surface by a blade. Stereolithography allows a resolution of about 0.1 mm with a layer thickness of 0.05 to 0.25 mm to be achieved at fast production speeds.

The first part and the second part may be made from the same material. By using the same material for the first part and the second part, it is possible to produce the first part and the second part simultaneously by additive manufacturing methods.

Forming the first part and/or forming the second part may further comprise, forming a temporary support structure and removing the temporary support structure. A temporary support structure allows a greater number of shapes, whether this is the outer shape of a part or the surface texture of a part, to be formed. A temporary support structure also improves the quality and reproducibility of a part formed by additive manufacturing as it improves the stability of the part while it is being formed and moved inside the additive manufacturing machine. The temporary support structure may be made from the same material as the part, or it may be made from a different material. For example, fused deposition modelling (FDM®) or fused filament fabrication allows a temporary support structure to be formed during the additive manufacturing process from a different material than the main component that is to be formed in the additive manufacturing process. The temporary support structure may be removed by chemical means, for example by dissolving the temporary support structure or by mechanical means, for example by using a knife or a brush, or it may be removed by a combination of chemical means and mechanical means.

The first part and the second part may be separably connected. For example, the second part may be inserted into a cavity in the first part and the second part may be manufactured slightly oversize to precisely fit into the cavity. If the second part is then inserted into the cavity in the first part, the second part is held in the cavity by the tension generated from squeezing the second part into the cavity in the first part. Alternatively, a thin layer of adhesive could be used to connect the second part to the first part strongly enough to allow further processing to produce the mold, while still allowing the first part and the second part to be separated upon application of a sufficient amount of force without damaging the first part or the second part.

If the first part and the second part are separably connected, the modularity of the process is increased advantageously. A single first part could be produced and used in combination with a second part comprising a first type of texture to produce a first mold with a first type of texture. The same first part could be used in combination with the second part comprising a second type of texture to produce a second mold with a second type of texture, wherein the shape of the second mold could be substantially similar to the shape of the first mold. "Substantially similar" in the present context means similar but with the exception of the texture due to the second part and manufacturing imperfections. Furthermore, since the greatest wear and tear is expected for the texture, it is possible to simply replace a second part on which the texture has deteriorated due to wear and tear while leaving the first part in place. Likewise, should the first part be damaged, for any reason, but the second part is still intact, only the first part needs to be replaced. This way, waste and the costs associated therewith can be reduced, resulting in a more favorable environmental impact.

Forming the first part may comprise forming a texture on the surface of the first part. In other words, a textured surface may be formed on both the first part and the second part. The textured surface on the first part could have a similar texture pattern to the texture pattern on the second part, or the first part may have a completely different texture pattern to the texture pattern of the second part. By forming a textured surface also on the first part, the overall grip provided by the molded component formed in the mold is improved, while the flexibility of combining a first part and the second part or a first part and a different second part remains.

Forming the texture on the surface of the first part and/or the second part may comprise forming at least one resolved feature of linear size of 0.2 mm or smaller. The inventors have found that a feature size of 0.2 mm or smaller significantly improves the amount of grip offered by the surface of the molded component for some applications, for example for a shoe sole on a hard surface. In some applications, the grip is even better when the feature has a size of 0.1 mm or smaller. The linear size can be measured along any linear direction on the surface of the first or second part, respectively. The feature could, for example, be a "hill-like" protrusion from the surface or a groove. Additive manufacturing allows a resolution of up to 0.01 mm.

Forming the texture on the surface of the first part and/or the second part may comprise forming at least one resolved feature of depth or height of between 0.01 mm and 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the molded component on soft ground, such as grass, mud, etc. and the greater the durability of the texture. However, a shallow texture, corresponding to a lower depth or height of the feature, may provide better grip on hard ground such as artificial turf, tarmac, etc.

The second part may be formed to be substantially smaller than the first part. This is advantageous for the stability of the master model as it allows the first part to essentially define the shape of the mold and, consequently, the molded component while the second part defines primarily the texture or part of the texture of the mold and, consequently, the molded component.

The invention further concerns a method for producing a mold comprising: (a) producing a master model according to a method described herein, and (b) forming a mold based on the master model. A mold produced using the master model described herein may have a higher resolution of texture and sharper features of the texture than a mold produced using techniques known in the art. An advantage of the present invention is that it allows the production time, or lead time, for producing a mold to be reduced significantly compared to conventional production processes for a textured mold.

Preferably the mold comprises a resolved feature of linear size of preferably 0.2 mm or smaller, more preferably 0.1 mm or smaller. The inventors have found that a feature size of 0.2 mm or smaller significantly improves the amount of grip offered by the surface of the molded component for some applications, for example for a shoe sole on a hard surface. In some applications the grip is even better when the feature has a size of 0.1 mm or smaller. The finer texture also leads to a more visually appealing look of the molded component.

The mold may be formed to comprise at least one feature with a depth or height of between 0.01 mm and 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the molded component on soft ground, such as grass, mud, etc. and the greater the durability of the texture. However, a shallow texture, corresponding to a lower depth or height of the feature, may provide better grip on hard ground such as artificial turf, tarmac, etc.

The mold may be made from a metal. Since the mold is to be used for the production of large amounts of molded components, it is important that the mold is sufficiently robust. A mold made from metal is simple to form as it can be, for example, formed by casting melted metal. A mold made from metal is also sufficiently robust to allow it to be generally used many times before the texture suffers damage.

The method of forming the mold may further comprise: (a) forming a second model based on the master model, (b) forming, from a heat-resistant material, a third model based on the second model; and wherein the mold is formed based on the third model.

The second model could, for example, be formed based on the master model by casting a liquid material into the master model and curing the liquid material. The third model could analogously be formed based on the second model by casting a liquid material into the second model and curing the liquid material. For example, the second model may be cast from silicone, which is a cost-effective material with low toxicity and can be easily used in low-temperature casting with the master model, without damaging the master model. For example, the third model may then be cast from a ceramic material, which has a high degree of heat-resistance, and may be cast into a silicone model. The ceramic material may be removed from the silicone mold and receive a heat treatment in order to fully consolidate its structure.

By adding these two additional steps it is possible to increase the output of molds produced per unit time by parallelizing the production. For example, several second models may be formed based on each master model, each of those second models can then be used to form several third models. Therefore, the number of third models may be much larger than the number of master models and therefore the output of molds per unit time can be significantly increased. Furthermore, this method allows a greater choice of materials for the master model, as the master model does not have to be heat resistant, even if the mold is formed by application of heat, for example by casting molten metal.

Moreover, the wear and tear of the master model is reduced. If N molds are to be produced, M forming operations, for example casting operations, have to be performed. However, due to the parallelization of the present method, the number M may be much smaller than the number N.

The invention further concerns a method for producing a sole element comprising:

(a) providing a mold according to a method described herein, (b) filling the mold with a curable liquid material, (c) curing the liquid material. A sole element produced using the method described herein may have a higher resolution of texture and sharper features of the texture than a mold produced using techniques known in the art. Preferably the sole element comprises a resolved feature of linear size of preferably 0.2 mm or smaller, more preferably 0.1 mm or smaller. The inventors have found that a feature size of 0.2 mm or smaller significantly improves the amount of grip offered by the surface of the sole element for some applications, for example for a shoe sole on a hard surface. In some applications the grip is even better when the feature has a size of 0.1 mm or smaller. The finer texture also leads to a more visually appealing look of the sole element.

Preferably the sole element is formed to comprise at least one feature with a depth or height of between 0.01 mm and 5 mm. For certain applications, the depth or height is preferably 0.01 mm to 1 mm. For other applications, it is preferable to have a depth or height of between 1 mm and 5 mm. The inventors have found that the deeper or higher the feature, compared to the surrounding surface, the better the grip offered by the sole element on soft ground, such as grass, mud, etc. and the greater the durability of the texture. However, a shallow texture, corresponding to a lower depth or height of the feature, may provide better grip on hard ground such as artificial turf, tarmac, etc.

The invention further concerns a method for producing an article of footwear comprising: (a) providing a sole element according to a method described herein, (b) providing an upper, (c) attaching the sole element to the upper. The article of footwear produced according to the method described herein has a better grip than an article of footwear known in the art.

The invention further concerns a method for producing a ball or a sports accessory comprising: (a) providing a mold according to a method described herein, (b) filling the mold with a curable liquid material, and (c) curing the liquid material. A sports accessory can be a glove, for example a glove for a goalkeeper, a shin guard, a handle for bicycle handlebars, handles for sports rackets, golf clubs, etc.

A ball or a sports accessory produced using the mold described herein may have a higher resolution of texture and sharper features of the texture than a mold produced using techniques known in the art. Preferably the sole element comprises at least one surface comprising a texture with a resolved feature of linear size of preferably 0.2 mm or smaller, more preferably 0.1 mm or smaller. The inventors have found that a feature size of 0.2 mm or smaller significantly improves the amount of grip offered by the surface of the sole element for some applications, for example to improve the grip of a football or a glove to catch a football. In some applications, the grip is even better when the feature has a size of 0.1 mm or smaller.

The ball or sports accessory may comprise at least one feature with a depth or height of between 0.01 mm to 5 mm. For certain applications, the depth or height is preferably 0.01 mm to 1 mm. For other applications, it is preferable to have a depth or height of between 1 mm and 5 mm. For example, the inventors have found that the deeper or higher the feature, compared to the surrounding surface, the greater is the level of protection offered by a shin guard, while maintaining a low weight. However, a shallow texture, corresponding to a lower depth or height of the feature, may provide better aerodynamic properties for example for part of the panels of a football.

BRIEF DESCRIPTION OF THE FIGURES

In the following, exemplary embodiments of the invention are described with reference to the figures. The figures show:

FIG. 3: An exemplary schematic of a method of forming a textured mold as known in the art;

FIG. 4: An exemplary schematic of a method of forming a mold according to the present invention;

DETAILED DESCRIPTION

In the following some embodiments of the invention are described in detail. It is to be understood that these embodiments can be modified in a number of ways and combined with each other whenever compatible and that certain features may be omitted in so far as they appear dispensable. While the invention is described primarily with reference to producing a mold for a sole element for an article of footwear, it is to be understood that the master model may be a positive or negative model which can be used to produce any mold and any molded component that requires a textured surface. For example, the master model may alternatively be used for the production of a mold for forming textured handles for bicycle handlebars, handles for sports rackets, golf clubs, balls, gloves, etc.

Figure 1A:
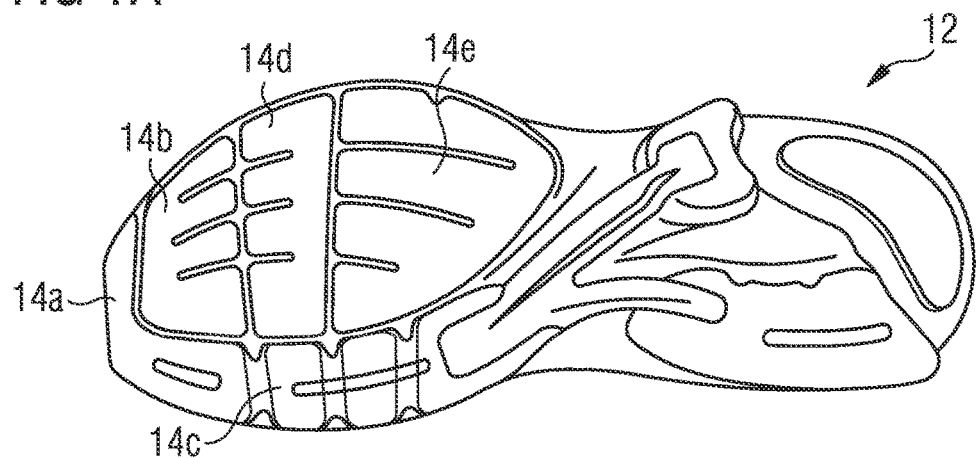
FIG. 1A-C: An exemplary master model according to the present invention.
Figure 1B:
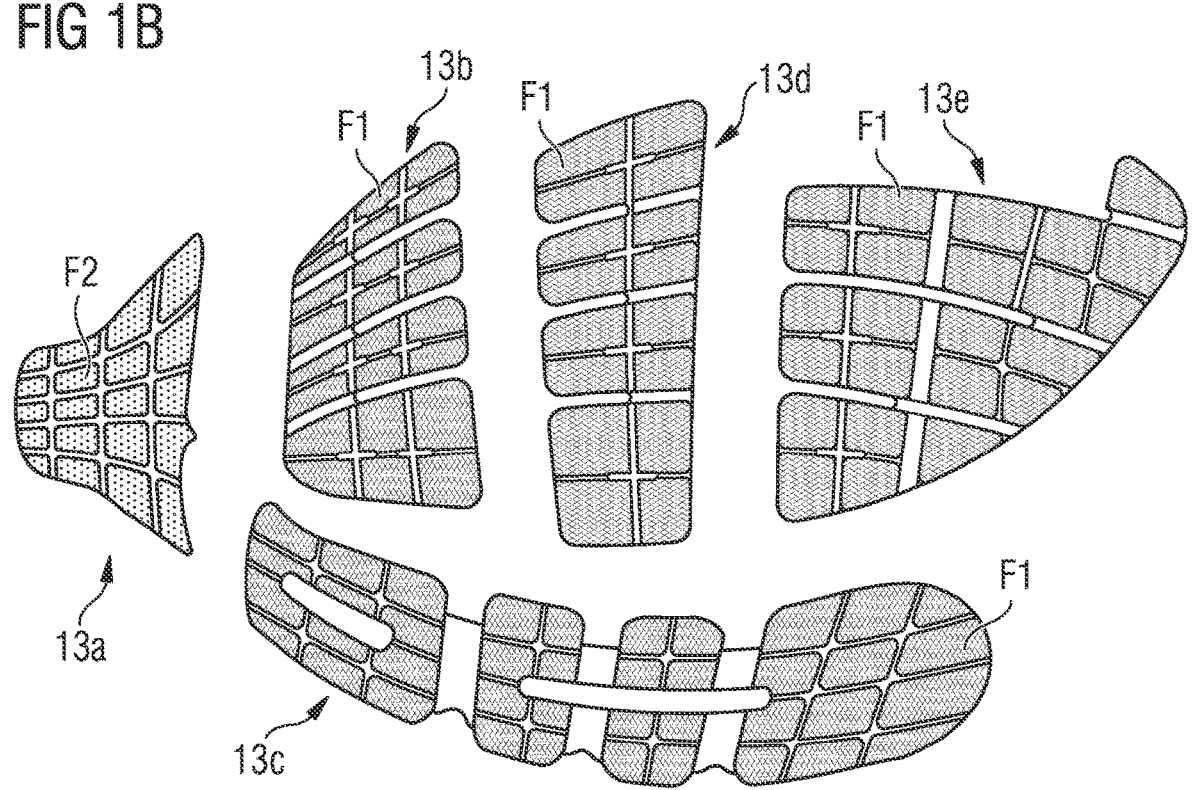

FIG. 1A shows an exemplary first part 12 according to the invention. FIG. 1B shows exemplary second parts 13a-13e configured to fit in the corresponding recesses 14a-14e, respectively, formed in the first part 12. The exemplary second parts 13a-13e all comprise a texture. It is to be understood that a master model according to the invention may comprise only a single second part. As shown in FIG. 1B, the texture pattern on the second part 13a is different to the texture pattern on the second parts 13b-13e. By using a different texture on the second part 13a to the texture on the second parts 13b-13e, it is possible to achieve an ideal level of grip for different parts of the molded component. Generally, the term "texture" or "textured surface" within the context of the present invention applies to any modulation of the height of a surface.

Figure 1C:
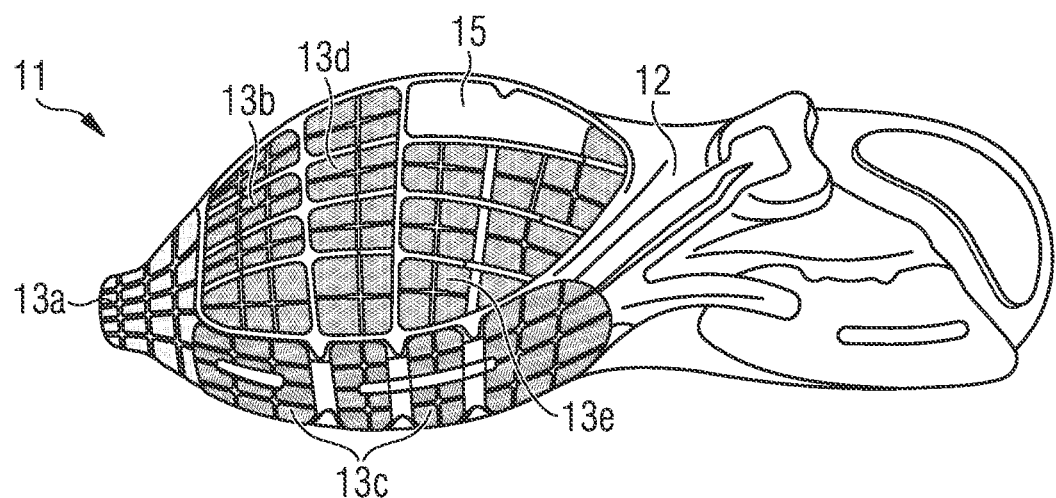

FIG. 1C shows an exemplary embodiment of a master model 11 for the production of a mold, comprising: (a) a first part 12 and (b) second parts 13a-13e each comprising a textured surface; wherein the first part 12 and the second parts 13a-13e are connected. Note that in the exemplary embodiment of FIG. 1C, one vacancy 15 for attaching another second part (not shown) is shown for illustration purposes.

The first part 12 and the second parts 13a-13e comprising a textured surface are preferably produced by additive manufacturing. Additive manufacturing is taken to have its conventional meaning. That is, additive manufacturing is any technique which applies an additive shaping principle and thereby builds physical 3D geometries by successive addition of material. Additive manufacturing comprises 3D printing and rapid prototyping. In particular, additive manufacturing comprises techniques such as laser sintering, direct metal laser sintering, selective laser melting, fused deposition modelling (FDM®), fused filament fabrication, and stereolithography. Any additive manufacturing method is suitable for the present invention.

An advantage of producing the first part 12 and the second parts 13a-13e of the master model 11 by additive manufacturing is that the number of process steps required during production can be reduced compared to the conventional way of producing a mold with a textured surface. This is further described with reference to FIGS. 3 and 4.

An advantage of the present invention is that a mold comprising a textured surface can be produced based on the master model 11 without chemical etching or laser texturing. This is because the master model 11 itself comprises the second parts 13a-13e comprising a textured surface. For example, the mold could be cast directly or indirectly based on the master model 11. Casting is a quick, cost-effective, and reproducible method that allows the production of large numbers of molds while retaining a high resolution of the texture. Resolution in the present context refers to the smallest size with which features can be formed deliberately and reproducibly.

Another advantage of producing the first part 12 and the second parts 13a-13e of the master model 11 by additive manufacturing is that additive manufacturing is an efficient method for forming a texture comprising an outward extension from the surface as well as a texture comprising a recess in the surface. Conventional manufacturing techniques, such as milling, laser texturing, or chemical etching, are effective only for textures forming a recess on the surface, which are performed by removing materials from the surface of a molded component. Therefore, in conventional manufacturing techniques large amounts of waste are generated when a texture is formed that comprises an outward extension from the surface. Though it would be possible to form a negative model comprising a grove first and then cast a positive model on that basis, this would lead to an additional process step and restrict the suitable choice of materials.

Furthermore, the resolution of the texture of a mold based on the master model 11 of the present invention is better than for a metallic mold produced directly by additive manufacturing. A better resolution of the texture allows for a greater variety of textures to be formed and, in general, therefore an improved level of grip.

Another advantage of the present invention is the increased flexibility of producing a mold. Due to the modular nature of the master model 11, a first mold with a first type of texture and a second mold with a second type of texture could, in general, be produced by designing only a single first part 12 of the master model 11 and by designing two or more varieties of the second parts 13a-13e of the master model 11. This way, the development process becomes more efficient.

In this exemplary embodiment, the mold is for the production of an article of footwear and the master model 11 is as a positive model of a portion of an article of footwear. The present invention is particularly suitable for forming a mold for the production of an article of footwear. This is because in a typical production environment for footwear, very large amounts of textured components need to be produced quickly and reproducibly. One master model 11 according to the present invention could be used to manufacture several molds which can then be used in parallel to produce a portion of the article of footwear by casting. If the master model 11 is a positive model of a portion of the article of footwear, it is possible to directly cast, within a single step, a mold that is a negative model of a portion of the article of footwear.

The first part 12 of the master model 11 is preferably formed such that the first part 12 substantially defines the rim of an entire sole element of the article of footwear. By "substantially define" it is meant in the present context that the shape of the rim of the sole element of the article of footwear is determined by the shape of the first part 12 of the master model 11 within manufacturing imperfections. The sole element is preferably an entire outsole of footwear but it may be only a portion of an outsole. The combination of the single first part 12 with different second parts 13a-13e with different textures therefore advantageously allows several articles of footwear to be constructed that are similar in size and shape but that require a different texture, for example a running shoe for soft ground and a running shoe for hard ground.

The first part 12 and/or the second parts 13a-13e are preferably made from a resin or polymer material. A first part 12 and/or second parts 13a-13e made from resin or polymer material are simple to construct with a high-resolution texture. Furthermore, a resin or polymer material allows sufficient strength and water resistance.

Forming the master model 11 may comprise activating a liquid photopolymer such that the liquid photopolymer solidifies. This is described in more detail with reference to FIG. 5.

The first part 12 and the second parts 13a-13e are preferably made from the same material. By using the same material for the first part 12 and the second parts 13a-13e, it is possible to produce the first part 12 and the second parts 13a-13e simultaneously by additive manufacturing methods.

In the exemplary master model 11 of FIG. 1C, the first part 12 and the second parts 13a-13e are separably connected. Here, each second part 13a,13b,13c,13d,13e is attached to a corresponding receiving portion 14a,14b,14c, 14d,14e, respectively, in the first part 12. Some receiving portions 14b,14c,14d,14e comprise a shallow cavity. A thin layer of adhesive is used to connect the second parts 13a-13e to the first part 12 strongly enough to allow further processing to produce the mold, while still allowing the first part 12 and the second parts 13a-13e to be separated upon application of a sufficient amount of force without damaging the first part 12 or the second parts 13a-13e. Alternatively, a deeper cavity could be used and the corresponding second part 13 is manufactured slightly oversize in order to precisely fit into the cavity. If the second part 13 is then inserted into the cavity in the first part 12, the second part 13 is held in the cavity by the tension generated from squeezing the second part 13 into the cavity in the first part 12.

If the first part 12 and the second parts 13a-13e are separably connected, the modularity of the process is increased advantageously. A single first part 12 could be produced and used in combination with a second part 13 comprising a first type of texture to produce a first mold with a first type of texture. The same first part 12 could be used in combination with the second part 13 comprising a second type of texture to produce a second mold with a second type of texture, wherein the shape of the second mold could be substantially similar to the shape of the first mold. "Substantially similar" in the present context means similar but with the exception of the texture due to the second part and manufacturing imperfections. Furthermore, since the greatest wear and tear is expected for the texture, it is possible to simply replace a second part 13 on which the texture has deteriorated due to wear and tear while leaving the first part 12 in place. Likewise, should the first part 12 be damaged, for any reason, but the second part 13 is still intact, only the first part 12 needs to be replaced. This way, waste and the costs associated therewith can be reduced, resulting in a more favorable environmental impact.

The exemplary first part 12 of FIG. 1 optionally can also have deep grooves on its surface in order to improve the surface traction in those portions where no second part 13 is attached.

In the exemplary embodiment of FIG. 1, forming the texture on the surface of the second part 13a comprises forming at least one resolved feature F2 of linear size of 0.2 mm or smaller. The inventors have found that a feature size of 0.2 mm or smaller significantly improves the amount of grip offered by the surface of the molded component for some applications, for example for a shoe sole on a hard surface. In the exemplary embodiment of FIG. 1, forming the texture on the surface of the second parts 13b-13e comprises forming at least one resolved feature F1 of linear size of 0.1 mm or smaller leading to an even better grip in portions where this is required. The linear size can be measured along any linear direction on the surface of the first or second part, respectively.

The features F1 and F2 of the textured surfaces of the second parts 13a-13e comprise a depth (in case of F1) or height (in case of F2) of between 0.01 mm and 1 mm. The inventors have found that a shallow texture, corresponding to a lower depth or height of the feature, may provide better grip on hard ground such as artificial turf, tarmac, etc.

In the exemplary embodiment of FIG. 1, the second parts 13a-13e are formed to be substantially smaller than the first part 12. This is advantageous for the stability of the master model as it allows the first part 12 to essentially define the shape of the mold and, consequently, the molded component while the second parts 13a-13e define primarily the texture or part of the texture of the mold and, consequently, the molded component.

Figure 2:
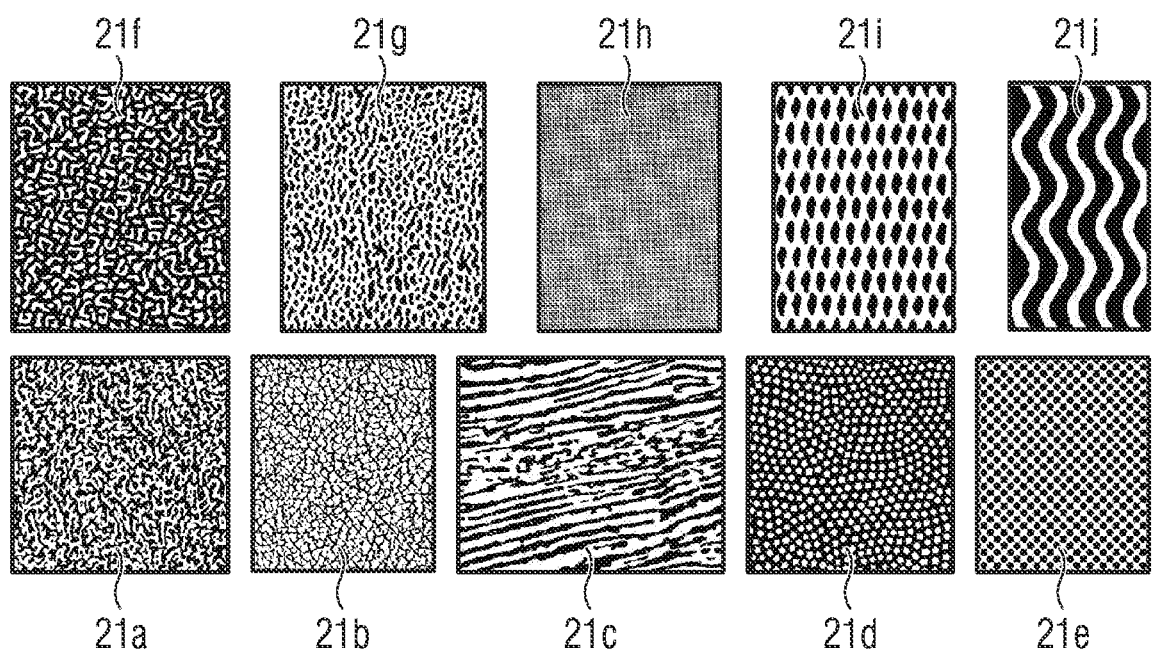
FIG. 2: Some exemplary textures for the master model according to the present invention.

FIG. 2 shows several exemplary texture patterns 21a-21j that may be formed directly by additive manufacturing on the surface of a first part and/or a second part. The optimal texture pattern is then chosen depending on the application. For example, for portions of a molded component that are expected to experience heavy wear during usage, a coarser pattern may be selected in order to reduce the wear and tear of the molded component. On the other hand in regions that experience less heavy wear during usage but that may require a high level of grip, a finer texture pattern may be selected. In addition to the size of the features, the shape of the features is another important criterion. For example, sharp features produce a better grip than rounded features. Another important criterion is the depth of the features. In the present invention, there is no fundamental limitation to the depth of the texture that can be formed, other than by the size of the additive manufacturing machine. Generally, a deeper texture leads to better grip, especially on soft ground, and greater wear resistance of the molded component.

FIG. 3 shows a method for producing a textured mold by chemical etching as known in the art. In a first step 31a a computer model of the mold is created by computer aided design (CAD). In a second step 31b, a set of instructions for computer aided machining (CAM) is produced based on the CAD model. In a third step 31c, computer numerical control (CNC) machining to produce a model for the mold is performed based on the CAM model. Typically, a model is carved out of wood by CNC machining. In a fourth step 31d, the model is finished manually by a qualified worker. In the fifth step 31e, the actual mold is formed by casting in which molten metal is filled into the model and cooled in order for it to solidify. In a sixth step 31f, the CAD model of the model is adjusted based on the casted mold. This is necessary because the model received some manual finishing. In a seventh step 31g, the mold is assembled. In an eight step 31h, trials are performed to check the performance of the un-textured mold. In a ninth step 31i, chemical texturing is performed on the untextured mold. Chemical texturing comprises: selecting a desired texture, preparing a silk screen plate, silkscreen printing the texture on cotton paper, drying the cotton paper, mapping the cotton paper onto the mold, pressing the mold to a stable texture, manually applying protective ink onto the mold, dipping the mold into a chemical tank and washing the mold before the textured mold is completed. After chemical texturing is completed, surface treatment is performed in a tenth step 31j.

Chemical texture etching is a highly manual process that requires a lot of time and produces large amounts of chemical waste because of the acid required to perform the etching.

FIG. 4 shows an exemplary method for producing the textured mold according to the present invention. At a high level and greatly simplified, the chemical etching process that is used to texture a mold as known in the art is replaced by a digital texturing process that is free of the toxic chemicals and acids required during conventional chemical etching.

In a first step 41a, a digital model of the master model is created using computer aided design (CAD). One or more texture patterns are then selected from a digital texture library. The digital texture is wrapped into the CAD model and then directly used in the second step 41b, to produce the master model including the texture on the second part or the first part and the second part. The master model is produced by additive manufacturing which is also referred to as 3D printing here. In a third step 41c, the mold is cast based on the model created in the second step 41b. The mold may be cast directly from the model, or the mold may be cast indirectly from the model through intermediate models as illustrated in FIG. 6. The mold can have separate parts which can be casted all together or separately at different steps. In a fourth step 41d, the casted mold is adjusted, or reverse engineered, in order to improve the quality of the mold and confirm that the separate parts of the mold fit well to each other. In a fifth step 41e, the mold is assembled. In other words, the separate parts of the mold are assembled together into a complete mold set which is to be used cooperatively to produce a molded component. For example, the mold can have an upper part and a lower part which form a mold cavity in between. The two parts of the mold are then used and fit together to produce a mold component. Trials of the mold are then performed in a sixth step 41f. In a seventh step 41g, the surface of the mold is treated, for example to prevent damage to the surface of the mold, to make it corrosion-resistant, and/or to give it a nonstick finish.

The present invention allows the lead time, that is the production time for producing a textured mold to be reduced significantly compared to the techniques known in the art and illustrated in FIG. 3. Though some manual finishing of the 3D printed model may be required, 3D printing is far more precise and reproducible than existing CNC techniques. Therefore, the amount of manual finishing required is greatly reduced in the present invention. Moreover, the 3D printing process itself is much faster than the combination of CAM and CNC as known in the art.

FIG. 5 shows an exemplary method for producing a first part according to the present invention. In this example, the first part is for a master model for a mold for producing an outsole for an article of footwear. While the illustration only shows the production of a first part, it is to be understood that the production of the second part would be similar. In particular, a texture can be formed on the first part and the second part in the step shown in FIG. 5A.

Figure 5A:
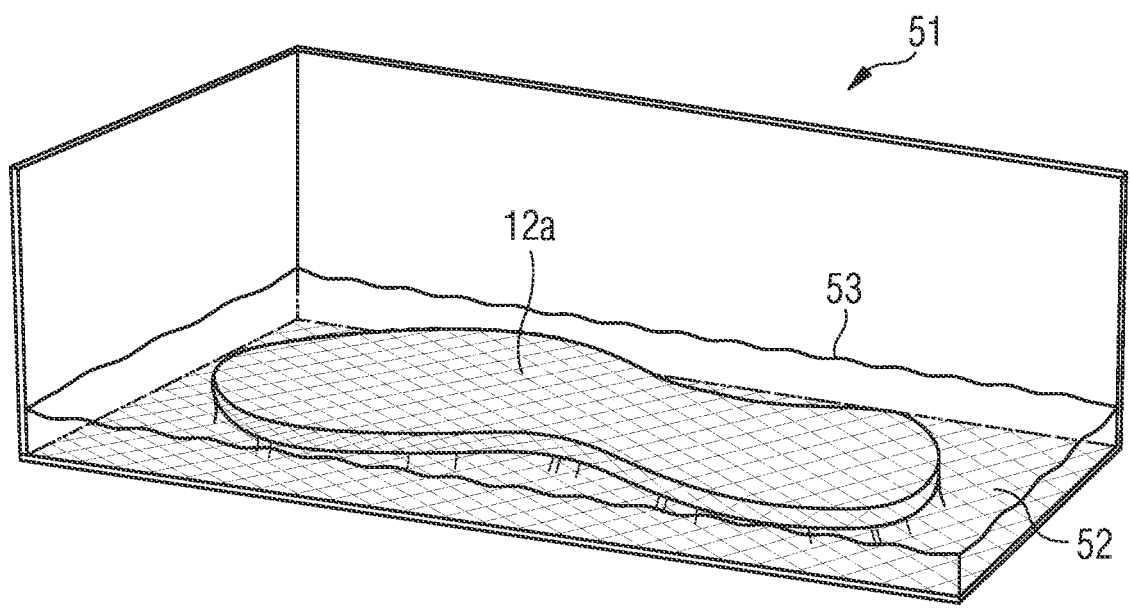
FIG. 5A-D: An exemplary method of forming part of a master model according to the present invention.

As shown in FIG. 5A, in a first step, a first part 12a is produced by additive manufacturing. In this example, the first part 12a is formed to have a textured surface. In this example, the first part 12a is produced by stereolithography inside a stereolithography machine 51. However, any additive manufacturing method is suitable. The first part 12a is formed immersed in a liquid photopolymer 53. While the boundary of the liquid photopolymer is shown curved for illustration purposes, the liquid photopolymer 53 preferably has a flat and sharp upper boundary. A light, for example a UV laser, is used to selectively activate the photopolymer 53, causing the photopolymer 53 to solidify in those locations where it is activated by the light. The light may be projected onto a single point, or several points simultaneously. For example, a single laser head may be used, or a double laser head may be used. It is also possible to simultaneously project the light onto many points, for example by controlling an array of mirrors, which allows the production speed to be increased. Once one layer is completed, the first part 12a is lowered, in this example by an elevator mechanism 52, and covered by an additional layer of liquid photopolymer for example by a blade (not shown). The process is then repeated on a layer by layer basis. Layers may range in thickness between 0.05 and 0.25 mm. The molding precision can be 0.1 mm or better. As an example, a suitable photopolymer is DSM Somos® Imagine 8000, which is a low-viscosity liquid photopolymer that produces water resistance, durable and accurate three-dimensional parts. The critical exposure required to activate DSM Somos® Imagine 8000 is about 13 millijoule per square centimetre. However, many types of photopolymer are suitable for the present invention.

Figure 5B:
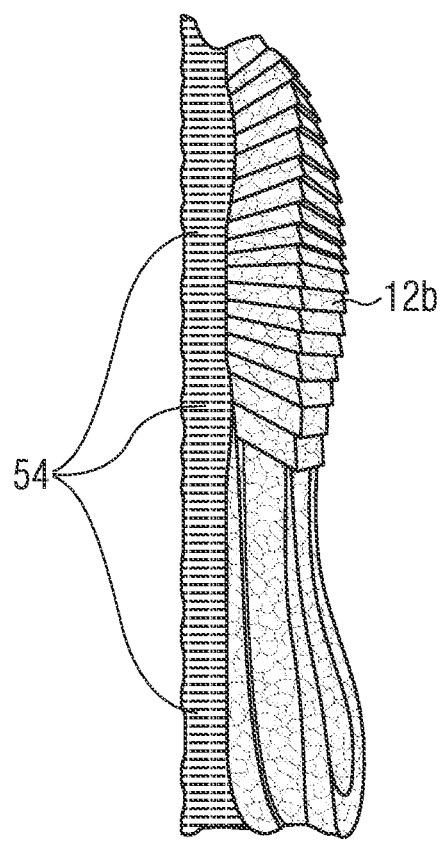
Figure 5C:
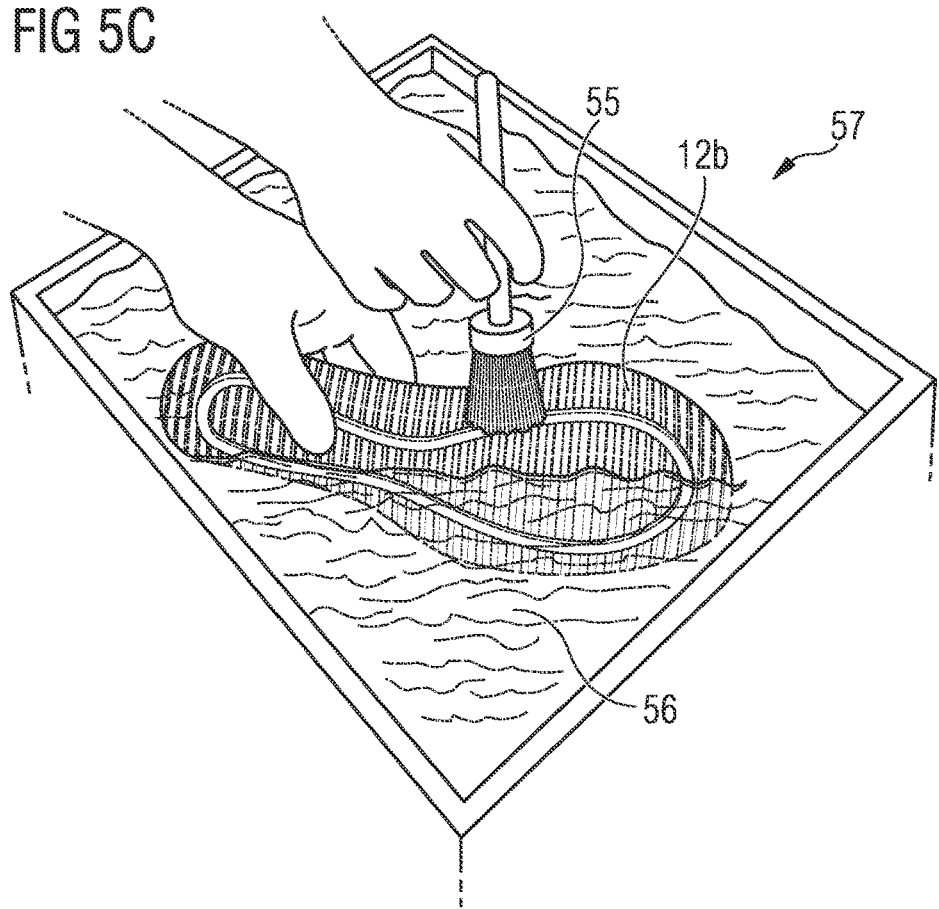

FIG. 5B shows the first part 12b, immediately after 3D printing. In order to improve the quality of the printed first part 12, the first part 12b contains a temporary support structure 54 that, in this example, was formed directly during the printing from the same material as the first part 12b. By using the temporary support structure 54, the stability of the first part 12a is improved during the 3D printing and therefore printing mistakes are less common. Furthermore, the temporary support structure 54 allows geometries and structures to be formed than would otherwise be difficult or impossible to form. FIG. 5C shows an exemplary method 57 of removing the temporary support structure 54. In this exemplary method 57, a combination of chemical and mechanical means are used to remove the temporary support structure. A cleaning solution 56 and a brush 55 are used to remove the temporary support structure from the first part 12b.

Figure 5D:
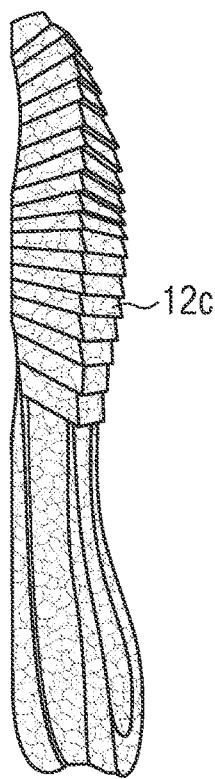

FIG. 5D shows a completed first part 12c from which the temporary support structure 54 has been removed. The first part 12c is ready for the next production step in which a second part (not shown) is attached to the first part in order to produce a master model according to the invention.

FIG. 6 shows several exemplary steps of a method of producing a mold according to the present invention. FIG. 6A shows a first part 12 produced, for example, as described with reference to FIG. 5. In this example, the first part 12 is for a master model for a mold for producing an outsole for an article of footwear. The first part 12 shown in FIG. 6A comprises two parts: 12a corresponding to the left outsole and 12b corresponding to the right outsole. A second part (not shown) is attached to the recesses 14 in the first part 12 by any suitable means. For example, a second part may be attached to the first part 12 by means of an adhesive.

Figure 6A:
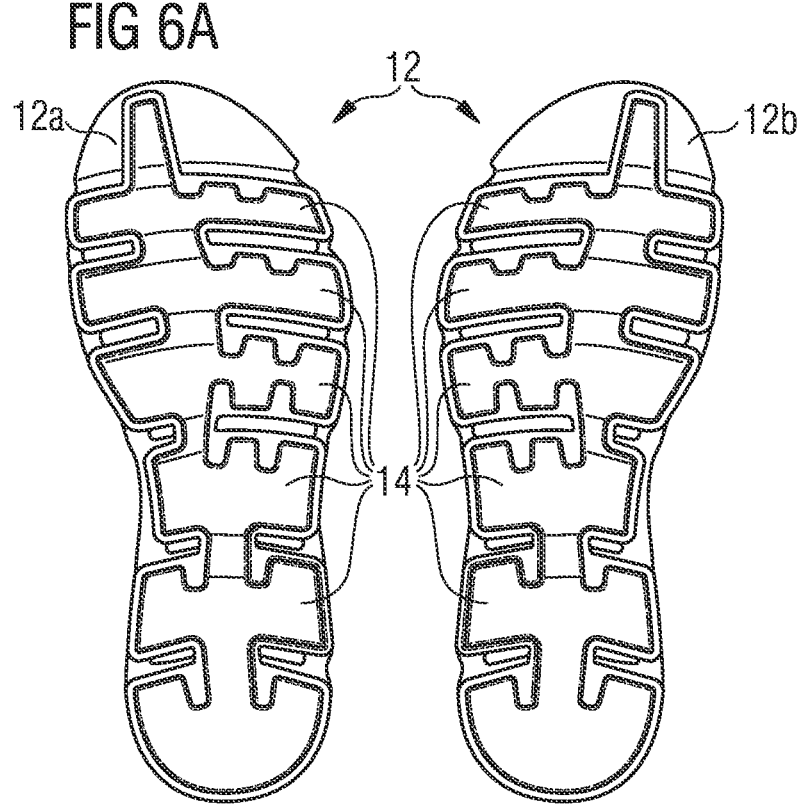
FIGS. 6A-G: An exemplary method of forming a mold according to the present invention.
Figure 6B:
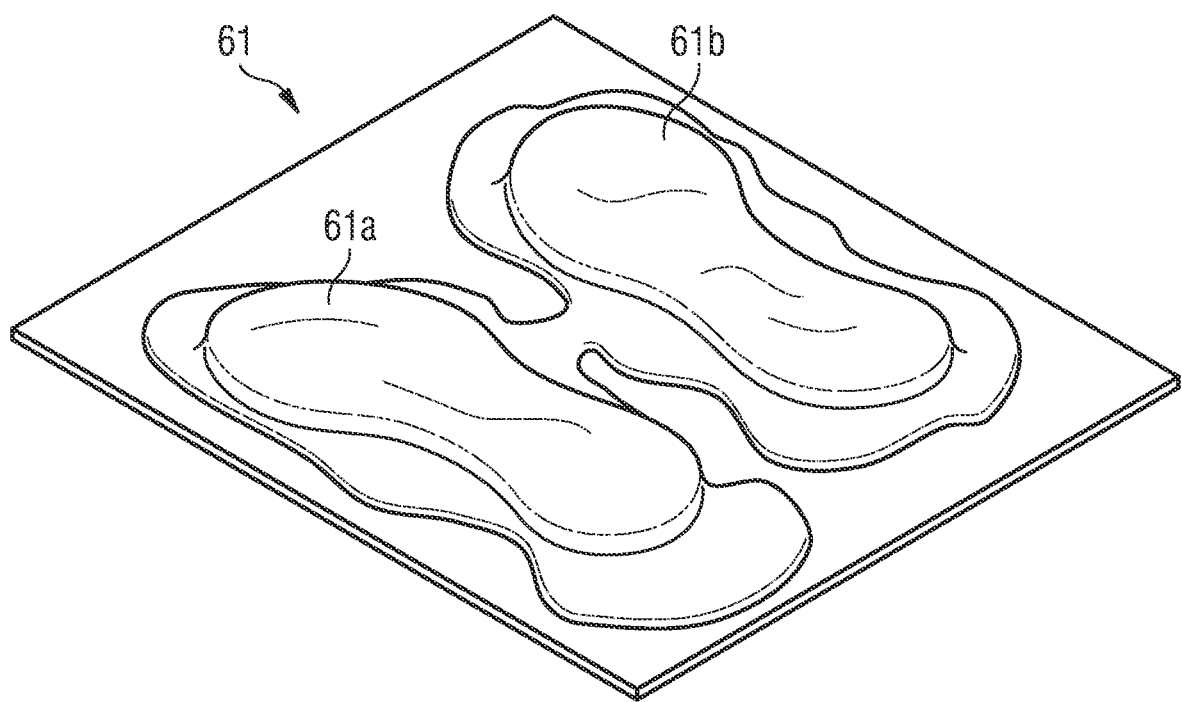

In the next step, shown in FIG. 6B a second model 61 is made from silicone. The silicone model 61 in the making comprises a left side 61a and a right side 61b which will correspond to the left outsole and the right outsole, respectively. As the first part 12 is a positive model of the outsole, the silicone mold 61 is a negative model, that is a cavity model, of the outsole to be formed.

Figure 6C:
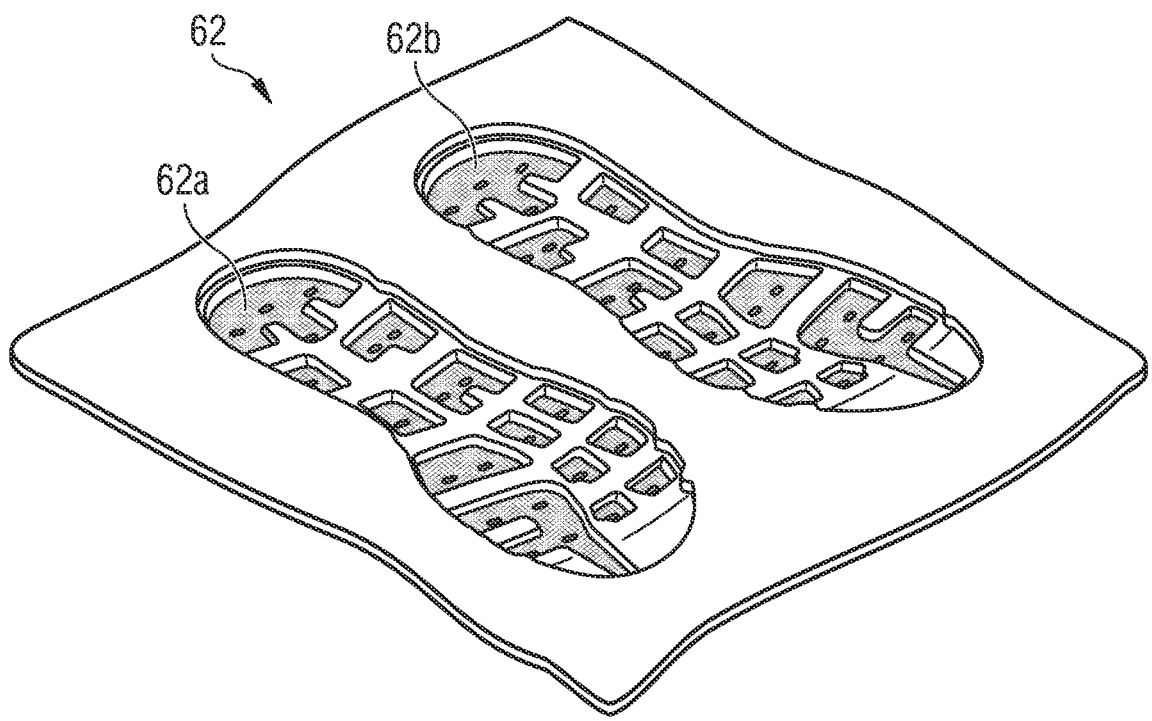

FIG. 6C shows the finished silicone model 62 comprising a left side portion 62a and a right side portion 62b. The texture in the silicone model 62 formed by the texture on the master model is clearly visible.

Figure 6D:
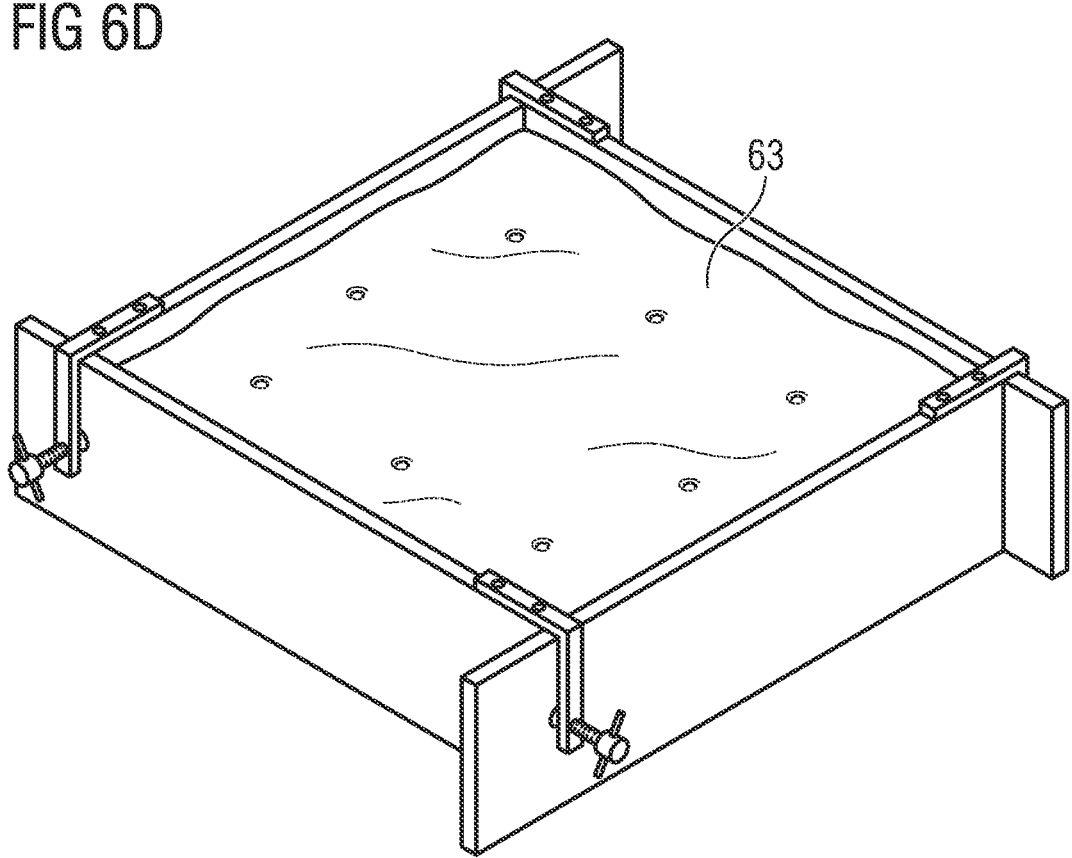

In the next step, illustrated in FIG. 6D, a third model 64 (shown in FIG. 6E) is made from a heat-resistant material 63. For example, the heat-resistant material could be a ceramic material.

Figure 6E:
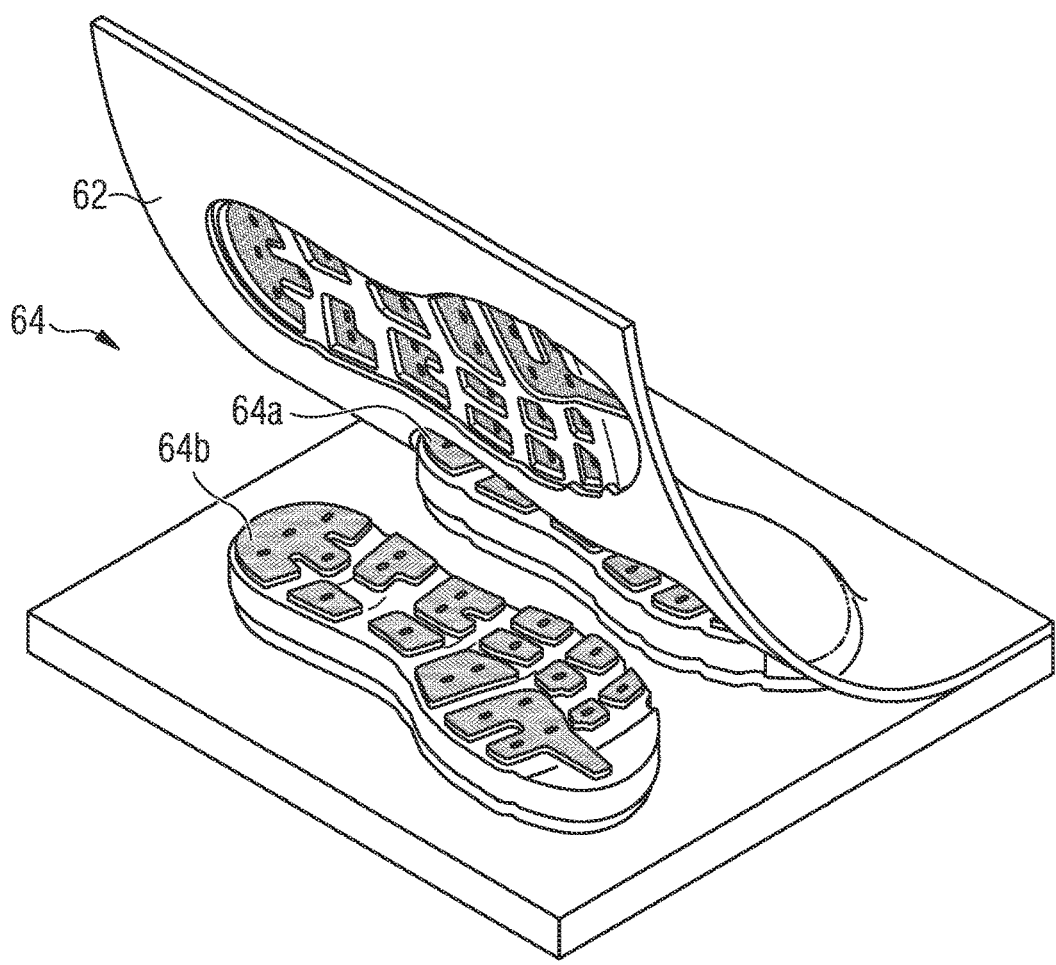

The resulting third model 64 is shown in FIG. 6E as the silicone model 62 is being removed. The method of forming the third model 64 may comprise heating the ceramic in order to consolidate its structure. The third model 64 comprises a left side portion 64a and a right side portion 64b.

Figure 6F:
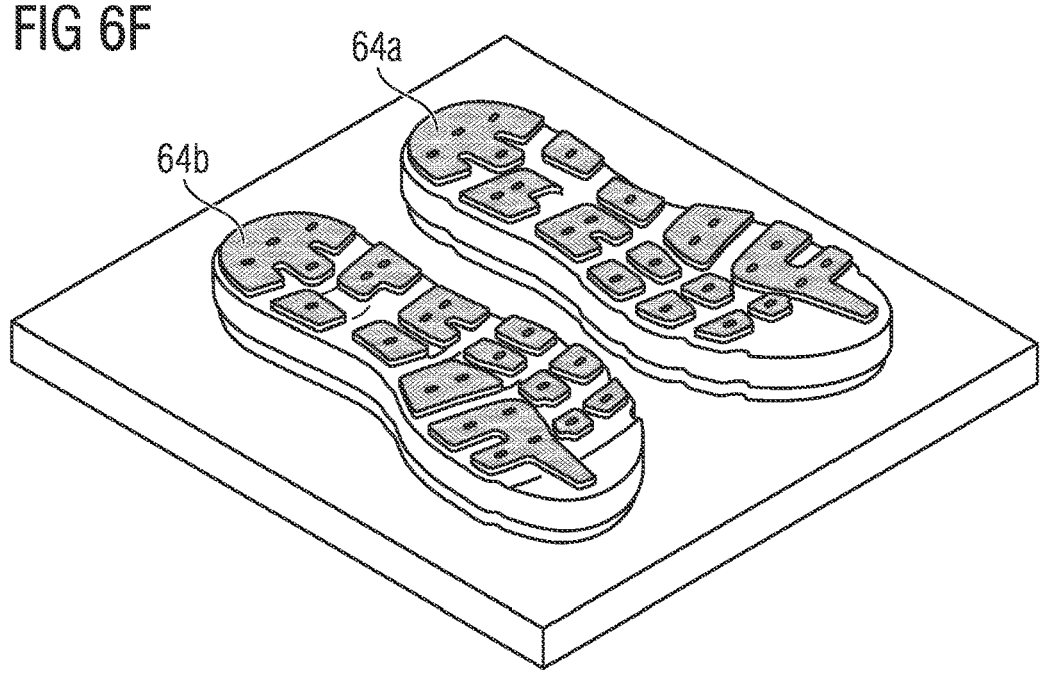

FIG. 6F shows the third model 64 after the silicone model has been removed.

Figure 6G:
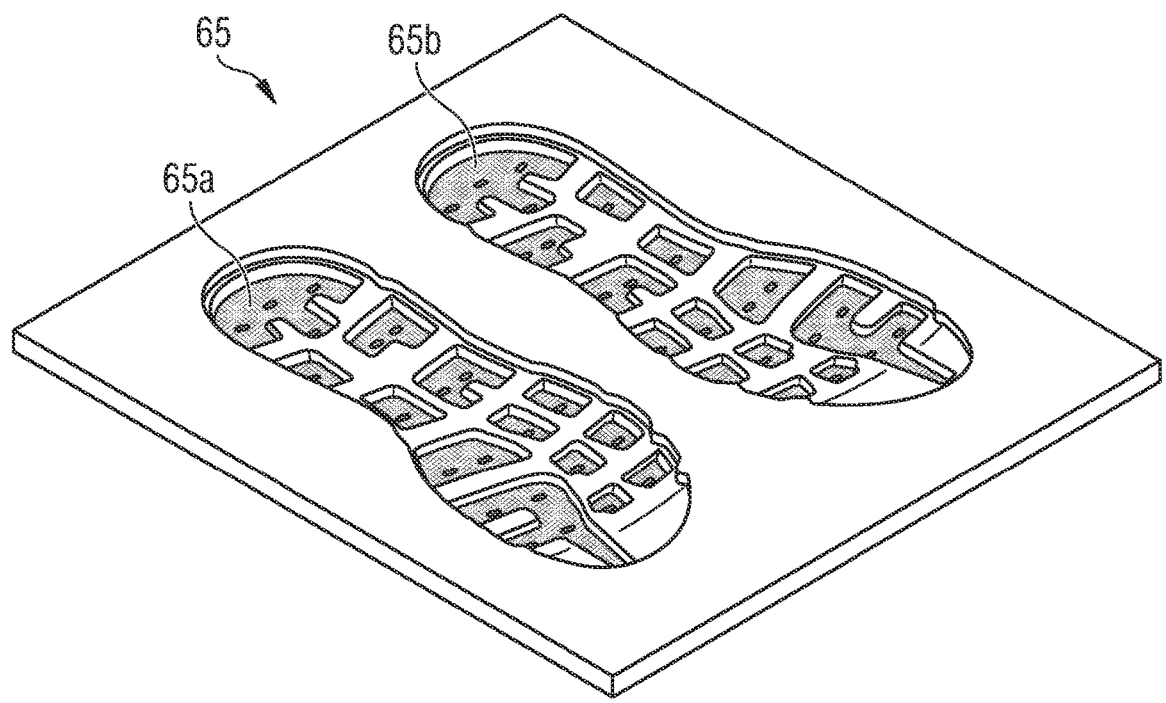

In the next step, the mold is formed by casting molten metal using the heat-resistant third model of FIGS. 6E and 6F. The metal is then cooled and allowed to solidify. FIG. 6G shows the resulting mold 65 which comprises a left side portion 65a and a right side portion 65b. The mold 65 is robust and may be used to produce large numbers of outsoles without damage or with reduced wear and tear on the texture formed in the mold 65.

The method shown in FIG. 6 to produce a mold 65 is advantageous especially on maintenance and protection of the master model according to the present invention. In this case, the master model can be made from 3D printing using materials such as acrylonitrile butadiene styrene (ABS), polyethylene (PE), polyamide (PA), or any polymer material. An intermediate ceramic casting core, which can be regarded as a negative model, is then made based on the master model and used to produce the final metal mold. In this case, it is more flexible on the choice of the material to make the master model, since the master model does not need to be subjected to a high temperature manufacture process.

Figure 7A:
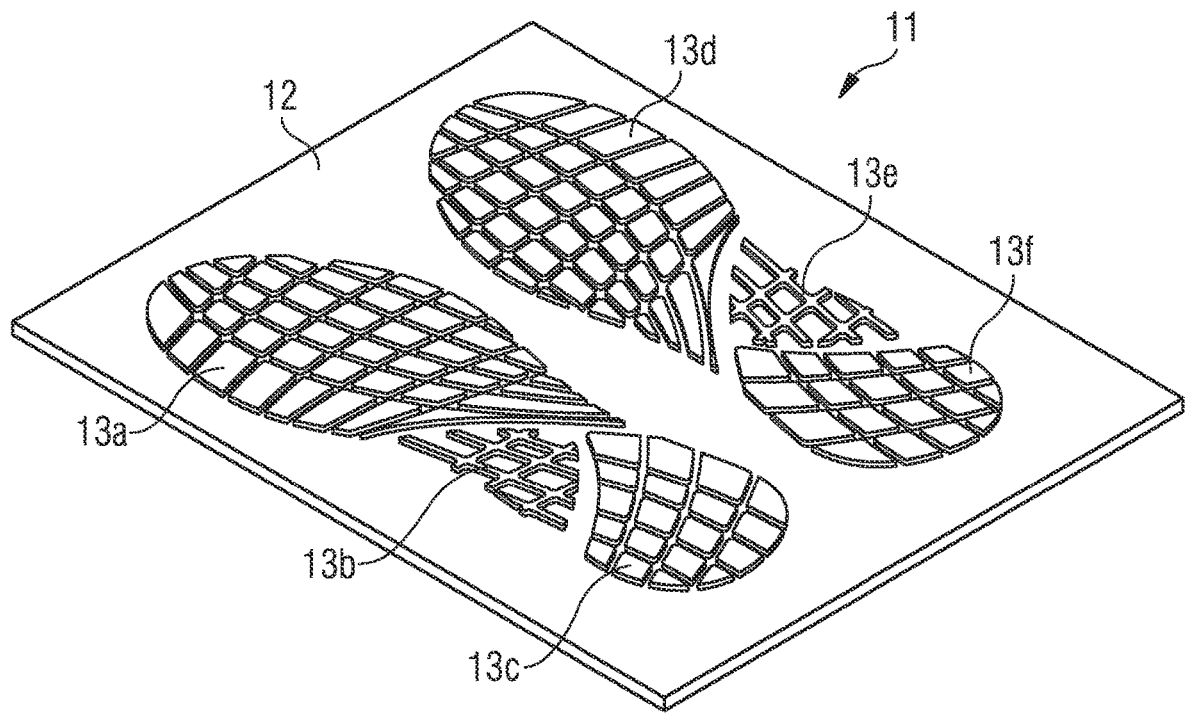
FIGS. 7A-C: An exemplary master model (FIG. 7A), an exemplary mold (FIG. 7B), and an exemplary sole element (FIG. 7C) according to the present invention.

FIG. 7 shows an exemplary method of forming an outsole 72 using a master model 11 according to the present invention. FIG. 7A shows a master model 11 comprising a first part 12 and two sets of second parts 13a, 13b, 13c for a left outsole and 13d, 13e, 13f for a right outsole; all of the second parts comprising a textured surface. The first part 12 and the second parts 13a-13f are connected by any suitable means, for example by means of an adhesive or a recess formed in the first part 12 configured to fit the second parts 13a-13f. Note that in this example, there is a single first part 12 for the production of two separate outsoles (left and right side).

The textured surfaces of the second parts 13a-13f comprise features with a depth of between 1 mm and 5 mm. The inventors have found that the deeper (or higher) the feature, compared to the surrounding surface, the better the grip offered by the molded component on soft ground, such as grass, mud, etc. and the greater the durability of the texture.

Figure 7B:
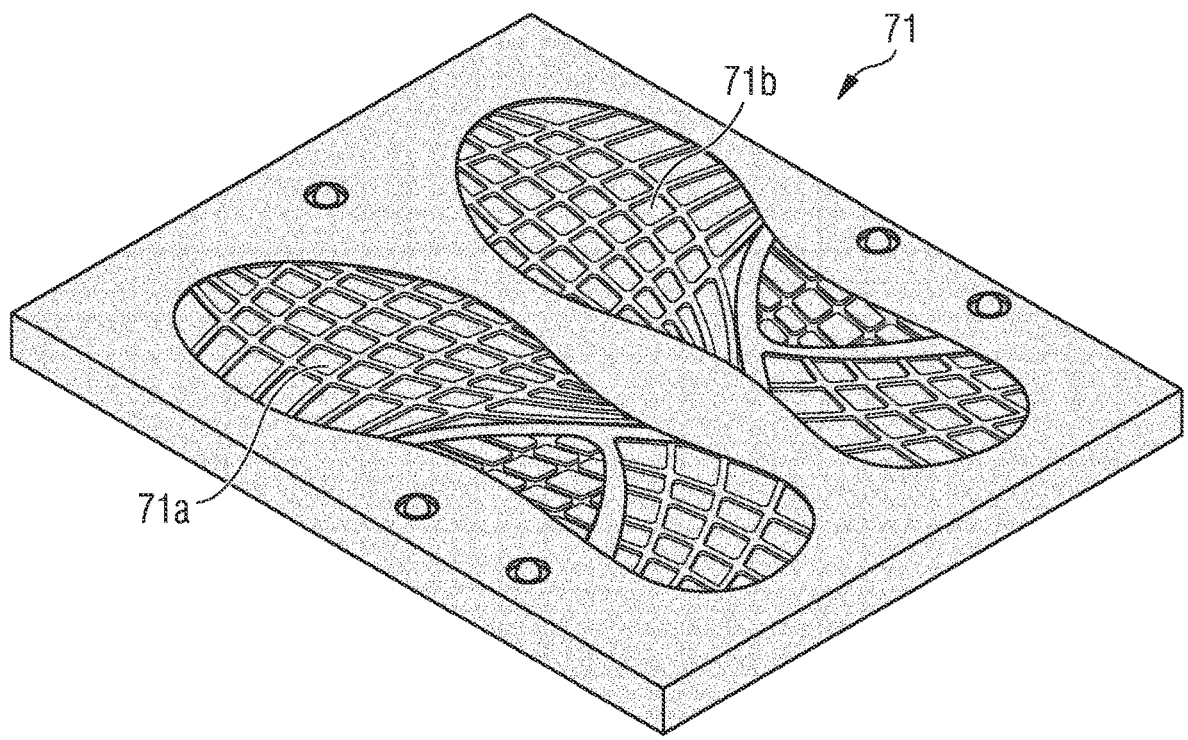

FIG. 7B shows an exemplary mold 71 formed based on the master model 11 by a method described herein. Note that the mold 71 is a single piece even though two separate outsoles are to be produced with the mold 71. The mold 71 comprises a left-side portion 71b and a right-side portion 71a, each comprising a textured surface. The mold 71 may be made from metal.

Figure 7C:
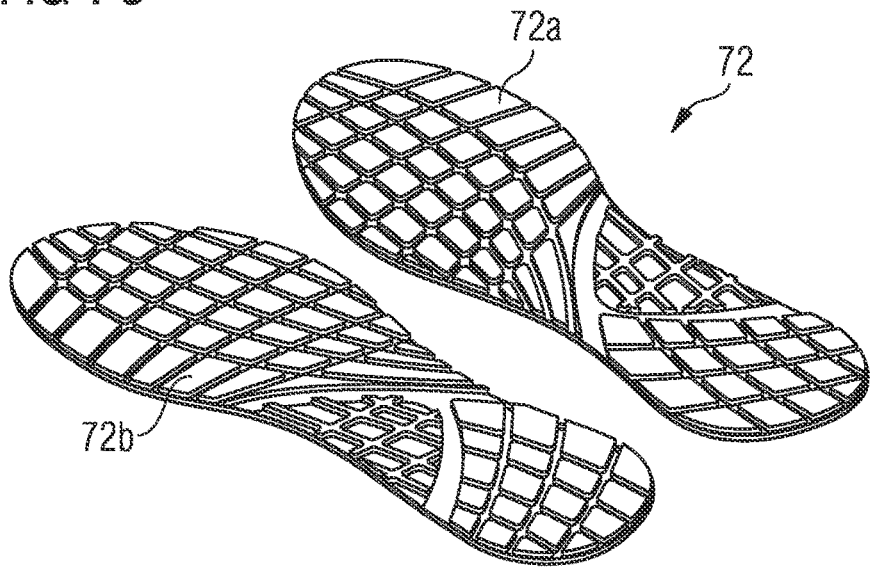

FIG. 7C shows an exemplary left outsole 72b and an exemplary right outsole 72a formed based on the master model 11 and a manufacturing method according to the present invention. The outsole 72 comprises a textured surface.

REFERENCE NUMERALS

11: Master model
12, 12a-12c: First part
13, 13a-13f: Second part
14, 14a-14e: Receiving portion
15: Vacancy
21, 21a-21j: Texture pattern
31a-31j, 41a-41g: Process steps
51: Stereolithography machine
52: Elevator mechanism
53: Liquid photopolymer
54: Temporary support structure
55: Brush
56: Cleaning solution
57: Method of removing temporary support structure
61, 61a, 61b; Silicone model in the making
62, 62a, 62b: Silicone model
63: Ceramic material
64, 64a, 64b: Ceramic model
65, 65a, 65b: Mold
71, 71a, 71b: Mold
72, 72a, 72b: Outsole

What is claimed is:

1. A master model for the production of a mold for an article of footwear, the master model comprising:

a first part substantially defining a rim of a sole element of an article of footwear; and a second part comprising a textured surface, wherein the first part and the second part are connected by separably fitting the second part into one of a plurality of recesses defined in the first part, wherein the first part and the second part are formed by additive manufacturing, and wherein another of the plurality of recesses of the first part is configured to be separably fit with a third part including a textured surface as part of the master model, the master model configured to allow for a plurality of articles of footwear to be constructed from the master model comprising a different textured surface.

2. The master model according to claim 1, wherein the master model is a positive model of a portion of the article of footwear.

3. The master model according to claim 1, wherein the master model is a negative model of a portion of the article of footwear.

4. The master model according to claim 1, wherein the first part and/or the second part is made from a resin or polymer material.

5. The master model according to claim 1, wherein the master model is made from an activated photopolymer.

6. The master model according to claim 1, wherein the first part and the second part are separably connected by an attaching material and/or adhesive.

7. The master model according to claim 1, wherein the first part comprises a textured surface.

8. The master model according to claim 7, wherein the textured surface of the first part and/or the second part comprises at least one resolved feature of linear size of 0.2 mm or smaller.

9. The master model according to claim 1, wherein the mold is a first mold, and wherein the master model further comprises a variation of the second part having a textured surface different from the textured surface of the second part, the variation of the second part configured to be separably fit into the one of the plurality of recesses defined in the first part so as to form a variation of the master model, and the variation of the master model configured to form second mold for an article of footwear.

* * * * *